United States Patent [19]

Fuderer et al.

[11] 3,986,849

[45] Oct. 19, 1976

[54] SELECTIVE ADSORPTION PROCESS

[75] Inventors: Andrija Fuderer; Ernst Rudelstorfer, both of Antwerp, Belgium

[73] Assignee: Union Carbide Corporation, New York, N.Y.

[22] Filed: Nov. 7, 1975

[21] Appl. No.: 630,050

[52] U.S. Cl. .......................................... 55/25; 55/66; 55/68

[51] Int. Cl.$^2$ .......................................... B01D 53/04

[58] Field of Search ............... 55/25, 26, 58, 62, 66, 55/68, 74, 75, 179

[56] References Cited

UNITED STATES PATENTS

| | | | |
|---|---|---|---|
| 3,430,418 | 3/1969 | Wagner | 55/25 |
| 3,564,816 | 2/1971 | Batta | 55/26 |
| 3,738,087 | 6/1973 | McCombs | 55/58 |
| 3,788,037 | 1/1974 | Shell et al. | 55/58 |

*Primary Examiner*—Charles N. Hart
*Assistant Examiner*—Robert H. Spitzer
*Attorney, Agent, or Firm*—John C. LeFever

[57] ABSTRACT

In an adiabatic pressure swing process for separation of feed gas mixtures such as $H_2$ containing $CO_2$ and $N_2$ impurities, at least seven adsorbent beds are employed of which at least two are receiving feed gas during the entire cycle, and with at least three pressure equalization stages.

5 Claims, 21 Drawing Figures

| ADSORBER | 1 | 2 | 3 | 4 | 5 | 6 | 7 | 8 | 9 | 10 | 11 | 12 | 13 | 14 | 15 | 16 | 17 | 18 | 19 | 20 | TIME UNIT |
|---|---|---|---|---|---|---|---|---|---|---|---|---|---|---|---|---|---|---|---|---|---|
| 1 | E1R | FR | A | | | | E1D | E2D | E3D | E2D | PP | | BD | | P | | E3R | E2R | E1R | FR | |
| 2 | E3R | E2R | E1R | FR | A | | | | E1D | E2D | E3D | | PP | | BD | | P | | E3R | E2R | |
| 3 | P | | E3R | E2R | E1R | FR | A | | | | E1D | E2D | E3D | | PP | | BD | | P | | |
| 4 | BD | | P | | E3R | E2R | E1R | FR | A | | | | E1D | E2D | E3D | | PP | | BD | | |
| 5 | PP | | BD | | P | | E3R | E2R | E1R | FR | A | | | | E1D | E2D | E3D | | PP | | |
| 6 | E3D | | PP | | BD | | P | | E3R | E2R | E1R | FR | A | | | | E1D | E2D | E3D | PP | |
| 7 | E1D | E2D | E3D | | PP | | BD | | P | | E3R | E2R | E1R | FR | A | | | | E1D | E2D | |
| 8 | A | | E1D | E2D | E3D | | PP | | BD | | P | | E3R | E2R | E1R | FR | A | | | | |
| 9 | A | | | | E1D | E2D | E3D | | PP | | BD | | P | | E3R | E2R | E1R | FR | A | | |
| 10 | | | A | | | | E1D | E2D | E3D | | PP | | BD | | P | | E3R | E2R | E1R | FR | |

TIME (minutes) — 13 min. 20 sec.

| TIME UNIT ↓ | VALVES OPEN | | | | | | | | | | | | | |
|---|---|---|---|---|---|---|---|---|---|---|---|---|---|---|
| 1 | 10 | 11 | 19 | 20 | 21 | 29 | 34 | 36 | 45 | 52 | 33 | 37 | 58 | 44 |
| 2 | 10 | 11 | 19 | 20 | 21 | 29 | 34 | 35 | 36 | 37 | 52 | 64 | 44 | 45 |
| 3 | 10 | 11 | 12 | 20 | 21 | 22 | 34 | 35 | 37 | 38 | 46 | 53 | 59 | 45 |
| 4 | 10 | 11 | 12 | 20 | 21 | 22 | 35 | 36 | 37 | 38 | 53 | 62 | 45 | 46 |
| 5 | 11 | 12 | 13 | 21 | 22 | 23 | 35 | 36 | 38 | 39 | 47 | 50 | 54 | 46 |
| 6 | 11 | 12 | 13 | 21 | 22 | 23 | 36 | 37 | 38 | 39 | 54 | 65 | 46 | 47 |
| 7 | 12 | 13 | 14 | 22 | 23 | 24 | 30 | 36 | 37 | 39 | 48 | 51 | 55 | 47 |
| 8 | 12 | 13 | 14 | 22 | 23 | 24 | 30 | 37 | 38 | 39 | 55 | 63 | 47 | 48 |
| 9 | 13 | 14 | 15 | 23 | 24 | 25 | 30 | 31 | 37 | 38 | 49 | 52 | 56 | 48 |
| 10 | 13 | 14 | 15 | 23 | 24 | 25 | 30 | 31 | 38 | 39 | 56 | 61 | 48 | 49 |
| 11 | 14 | 15 | 16 | 24 | 25 | 26 | 31 | 32 | 38 | 39 | 40 | 53 | 57 | 49 |
| 12 | 14 | 15 | 16 | 24 | 25 | 26 | 30 | 31 | 32 | 39 | 57 | 64 | 49 | 40 |
| 13 | 15 | 16 | 17 | 25 | 26 | 27 | 30 | 32 | 33 | 39 | 41 | 54 | 58 | 40 |
| 14 | 15 | 16 | 17 | 25 | 26 | 27 | 30 | 31 | 32 | 33 | 58 | 62 | 40 | 41 |
| 15 | 16 | 17 | 18 | 26 | 27 | 28 | 30 | 31 | 33 | 34 | 42 | 55 | 59 | 41 |
| 16 | 16 | 17 | 18 | 26 | 27 | 28 | 31 | 32 | 33 | 34 | 59 | 65 | 41 | 42 |
| 17 | 17 | 18 | 19 | 27 | 28 | 29 | 31 | 32 | 34 | 35 | 43 | 50 | 56 | 42 |
| 18 | 17 | 18 | 19 | 27 | 28 | 29 | 32 | 33 | 34 | 35 | 50 | 63 | 42 | 43 |
| 19 | 10 | 18 | 19 | 20 | 28 | 29 | 32 | 33 | 35 | 36 | 44 | 51 | 57 | 43 |
| 20 | 10 | 18 | 19 | 20 | 28 | 29 | 33 | 34 | 35 | 36 | 51 | 61 | 43 | 44 |

FIG. 3

| Adsorber | 1 | 2 | 3 | 4 | 5 | 6 | 7 | 8 | 9 | 10 | 11 | 12 | 13 | 14 | 15 | 16 | 17 | 18 | TIME UNIT |
|---|---|---|---|---|---|---|---|---|---|---|---|---|---|---|---|---|---|---|---|
| 1 | E1R | FR | A | | | E1D | E2D | E3D | PP | P | BD | PP | E1D | E2D | E3R | E2R | E1R | FR | |
| 2 | E3R | E2R | E1R | FR | A | | | E1D | E2D | E3D | PP | P | BD | PP | E3R | E2R | E3R | E2R | |
| 3 | P | BD | PP | E1D | E2D | E3D | PP | P | BD | PP | E1D | E2D | E3R | E2R | E1R | FR | A | | |
| 4 | PP | P | BD | PP | E1D | E2D | E3D | PP | P | BD | PP | E3R | E2R | E1R | FR | A | | | |
| 5 | E3D | PP | E1D | E2D | E3R | E2R | E1R | FR | A | | | E1D | E2D | E3D | PP | P | BD | PP | |
| 6 | E1D | E2D | E3R | E2R | E1R | FR | A | | | E1D | E2D | E3D | PP | P | BD | PP | E3D | PP | |
| 7 | A | | | E1D | E2D | E3D | PP | P | BD | PP | E3R | E2R | E1R | FR | A | | | | |
| 8 | | A | | | E1D | E2D | E3D | PP | P | BD | PP | E3R | E2R | E1R | FR | A | | | |
| 9 | A | | | E1D | E2D | E3D | PP | P | BD | PP | E3R | E2R | E1R | FR | A | | | | |

TIME (minutes)

| TIME UNIT ↓ | VALVES OPEN | | | | | | | | | | | |
|---|---|---|---|---|---|---|---|---|---|---|---|---|
| 1 | 11 | 21 | 52 | 57 | 63 | 66 | 34 | 35 | 18 | 28 | 19 | 29 | 44 |
| 2 | 11 | 21 | 52 | 63 | 67 | 34 | 36 | 45 | 18 | 28 | 19 | 29 | 44 |
| 3 | 11 | 21 | 12 | 22 | 53 | 58 | 64 | 67 | 35 | 36 | 19 | 29 | 45 |
| 4 | 11 | 21 | 12 | 22 | 53 | 64 | 68 | 35 | 37 | 46 | 19 | 29 | 45 |
| 5 | 11 | 21 | 12 | 22 | 13 | 23 | 54 | 59 | 65 | 68 | 36 | 37 | 46 |
| 6 | 11 | 21 | 12 | 22 | 13 | 23 | 54 | 65 | 69 | 36 | 38 | 47 | 46 |
| 7 | 51 | 55 | 12 | 22 | 13 | 23 | 14 | 24 | 66 | 69 | 37 | 38 | 47 |
| 8 | 61 | 66 | 12 | 22 | 13 | 23 | 14 | 24 | 55 | 37 | 39 | 48 | 47 |
| 9 | 61 | 67 | 52 | 56 | 13 | 23 | 14 | 24 | 15 | 25 | 38 | 39 | 48 |
| 10 | 31 | 38 | 62 | 67 | 13 | 23 | 14 | 24 | 15 | 25 | 56 | 49 | 48 |
| 11 | 31 | 39 | 62 | 68 | 53 | 57 | 14 | 24 | 15 | 25 | 16 | 26 | 49 |
| 12 | 41 | 32 | 39 | 63 | 68 | 14 | 24 | 15 | 25 | 16 | 26 | 57 | 49 |
| 13 | 31 | 32 | 63 | 69 | 54 | 58 | 17 | 27 | 15 | 25 | 16 | 26 | 41 |
| 14 | 31 | 33 | 42 | 64 | 69 | 15 | 25 | 16 | 26 | 17 | 27 | 58 | 41 |
| 15 | 61 | 64 | 32 | 33 | 55 | 59 | 16 | 26 | 17 | 27 | 18 | 28 | 42 |
| 16 | 61 | 65 | 32 | 34 | 43 | 16 | 26 | 17 | 27 | 18 | 28 | 59 | 42 |
| 17 | 51 | 56 | 62 | 65 | 33 | 34 | 17 | 27 | 18 | 28 | 19 | 29 | 43 |
| 18 | 51 | 62 | 66 | 33 | 35 | 44 | 17 | 27 | 18 | 28 | 19 | 29 | 43 |

| ADSORBER \ TIME UNIT | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | A | | | | E1D | E2D | PP | | E3D | BD | P | | E3R | E2R | E1R | FR |
| 2 | E1R | FR | A | | | | E1D | E2D | PP | | E3D | BD | P | | E3R | E2R |
| 3 | E3R | E2R | E1R | FR | A | | | | E1D | E2D | PP | | E3D | BD | P | |
| 4 | P | | E3R | E2R | E1R | FR | A | | | | E1D | E2D | PP | | E3D | BD |
| 5 | E3D | BD | P | | E3R | E2R | E1R | FR | A | | | | E1D | E2D | PP | |
| 6 | PP | | E3D | BD | P | | E3R | E2R | E1R | FR | A | | | | E1D | E2D |
| 7 | E1D | E2D | PP | | E3D | BD | P | | E3R | E2R | E1R | FR | A | | | |
| 8 | A | | E1D | E2D | PP | | E3D | BD | P | | E3R | E2R | E1R | FR | A | |

TIME (minutes) → 1 2 3 4 5 6 7 8 9 10 11 12 13 14 15 16

| TIME UNIT | VALVES OPEN | | | | | | | | | | | | |
|---|---|---|---|---|---|---|---|---|---|---|---|---|---|
| 1 | 11 | 21 | 52 | 57 | 33 | 61 | 35 | 34 | 62 | 36 | 18 | 28 | 44 |
| 2 | 11 | 21 | 52 | 33 | 37 | 34 | 62 | 36 | 45 | 18 | 28 | 44 | |
| 3 | 11 | 21 | 12 | 22 | 53 | 58 | 34 | 62 | 36 | 35 | 61 | 37 | 45 |
| 4 | 11 | 21 | 12 | 22 | 53 | 34 | 38 | 35 | 61 | 37 | 46 | 45 | |
| 5 | 51 | 54 | 12 | 22 | 13 | 23 | 35 | 61 | 37 | 36 | 62 | 38 | 46 |
| 6 | 31 | 35 | 12 | 22 | 13 | 23 | 54 | 36 | 62 | 38 | 47 | 46 | |
| 7 | 31 | 61 | 37 | 52 | 55 | 13 | 23 | 14 | 24 | 36 | 62 | 38 | 47 |
| 8 | 31 | 61 | 37 | 32 | 36 | 13 | 23 | 14 | 24 | 55 | 48 | 47 | |
| 9 | 31 | 61 | 37 | 32 | 62 | 38 | 53 | 56 | 14 | 24 | 15 | 25 | 48 |
| 10 | 41 | 32 | 62 | 38 | 33 | 37 | 14 | 24 | 15 | 25 | 56 | 48 | |
| 11 | 31 | 61 | 33 | 32 | 62 | 38 | 54 | 57 | 15 | 25 | 16 | 26 | 41 |
| 12 | 31 | 61 | 33 | 42 | 34 | 38 | 15 | 25 | 16 | 26 | 57 | 41 | |
| 13 | 31 | 61 | 33 | 32 | 62 | 34 | 55 | 58 | 16 | 26 | 17 | 27 | 42 |
| 14 | 31 | 35 | 32 | 62 | 34 | 43 | 16 | 26 | 17 | 27 | 58 | 42 | |
| 15 | 51 | 56 | 32 | 62 | 34 | 33 | 61 | 35 | 17 | 27 | 18 | 28 | 43 |
| 16 | 51 | 32 | 36 | 33 | 61 | 35 | 44 | 17 | 27 | 18 | 28 | 43 | |

<table>
<tr><th>ADSORBER \ TIME UNIT</th><th>1</th><th>2</th><th>3</th><th>4</th><th>5</th><th>6</th><th>7</th><th>8</th><th>9</th><th>10</th><th>11</th><th>12</th><th>13</th><th>14</th><th>15</th><th>16</th></tr>
<tr><td>1</td><td colspan="4">A</td><td>E1D</td><td>E2D</td><td>E3D</td><td>E4D</td><td>PP</td><td>BD</td><td>P</td><td>E4R</td><td>E3R</td><td>E2R</td><td>E1R</td><td>FR</td></tr>
<tr><td>2</td><td>E1R</td><td>FR</td><td colspan="4">A</td><td>E1D</td><td>E2D</td><td>E3D</td><td>E4D</td><td>PP</td><td>BD</td><td>P</td><td>E4R</td><td>E3R</td><td>E2R</td></tr>
<tr><td>3</td><td>E3R</td><td>E2R</td><td>E1R</td><td>FR</td><td colspan="4">A</td><td>E1D</td><td>E2D</td><td>E3D</td><td>E4D</td><td>PP</td><td>BD</td><td>P</td><td>E4R</td></tr>
<tr><td>4</td><td>P</td><td>E4R</td><td>E3R</td><td>E2R</td><td>E1R</td><td>FR</td><td colspan="4">A</td><td>E1D</td><td>E2D</td><td>E3D</td><td>E4D</td><td>PP</td><td>BD</td></tr>
<tr><td>5</td><td>PP</td><td>BD</td><td>P</td><td>E4R</td><td>E3R</td><td>E2R</td><td>E1R</td><td>FR</td><td colspan="4">A</td><td>E1D</td><td>E2D</td><td>E3D</td><td>E4D</td></tr>
<tr><td>6</td><td>E3D</td><td>E4D</td><td>PP</td><td>BD</td><td>P</td><td>E4R</td><td>E3R</td><td>E2R</td><td>E1R</td><td>FR</td><td colspan="4">A</td><td>E1D</td><td>E2D</td></tr>
<tr><td>7</td><td>E1D</td><td>E2D</td><td>E3D</td><td>E4D</td><td>PP</td><td>BD</td><td>P</td><td>E4R</td><td>E3R</td><td>E2R</td><td>E1R</td><td>FR</td><td colspan="4">A</td></tr>
<tr><td>8</td><td colspan="2">A</td><td>E1D</td><td>E2D</td><td>E3D</td><td>E4D</td><td>PP</td><td>BD</td><td>P</td><td>E4R</td><td>E3R</td><td>E2R</td><td>E1R</td><td>FR</td><td colspan="2">A</td></tr>
<tr><td>TIME (minutes) →</td><td>1</td><td>2</td><td>3</td><td>4</td><td>5</td><td>6</td><td>7</td><td>8</td><td>9</td><td>10</td><td>11</td><td>12</td><td>13</td><td>14</td><td>15</td><td>16</td></tr>
</table>

FIG. 13

| TIME UNIT ↓ | VALVES OPEN | | | | | | | | | | |
|---|---|---|---|---|---|---|---|---|---|---|---|
| 1 | 11 | 21 | 52 | 57 | 33 | 36 | 64 | 65 | 18 | 28 | 44 |
| 2 | 11 | 21 | 72 | 33 | 37 | 64 | 66 | 45 | 18 | 28 | |
| 3 | 11 | 21 | 12 | 22 | 53 | 58 | 34 | 37 | 65 | 66 | 45 |
| 4 | 11 | 21 | 12 | 22 | 73 | 34 | 38 | 65 | 67 | 46 | |
| 5 | 51 | 54 | 12 | 22 | 13 | 23 | 35 | 38 | 66 | 67 | 46 |
| 6 | 31 | 35 | 12 | 22 | 13 | 23 | 74 | 66 | 68 | 47 | |
| 7 | 31 | 36 | 52 | 55 | 13 | 23 | 14 | 24 | 67 | 68 | 47 |
| 8 | 61 | 67 | 32 | 36 | 13 | 23 | 14 | 24 | 75 | 48 | |
| 9 | 61 | 68 | 32 | 37 | 53 | 56 | 14 | 24 | 15 | 25 | 48 |
| 10 | 41 | 62 | 68 | 33 | 37 | 14 | 24 | 15 | 25 | 76 | |
| 11 | 61 | 62 | 33 | 38 | 54 | 57 | 15 | 25 | 16 | 26 | 41 |
| 12 | 61 | 63 | 42 | 34 | 38 | 15 | 25 | 16 | 26 | 77 | |
| 13 | 31 | 34 | 62 | 63 | 55 | 58 | 16 | 26 | 17 | 27 | 42 |
| 14 | 31 | 35 | 62 | 64 | 43 | 16 | 26 | 17 | 27 | 78 | |
| 15 | 51 | 56 | 32 | 35 | 63 | 64 | 17 | 27 | 18 | 28 | 43 |
| 16 | 71 | 32 | 36 | 63 | 65 | 44 | 17 | 27 | 18 | 28 | |

| TIME UNIT ↓ | VALVES OPEN | | | | | | | | | |
|---|---|---|---|---|---|---|---|---|---|---|
| 1 | 11 | 21 | 52 | 56 | 63 | 65 | 34 | 17 | 27 | 44 |
| 2 | 11 | 21 | 52 | 63 | 66 | 34 | 45 | 17 | 27 | 44 |
| 3 | 11 | 21 | 12 | 22 | 53 | 57 | 64 | 66 | 35 | 45 |
| 4 | 11 | 21 | 12 | 22 | 53 | 64 | 67 | 35 | 46 | 45 |
| 5 | 51 | 54 | 12 | 22 | 13 | 23 | 65 | 67 | 36 | 46 |
| 6 | 61 | 65 | 12 | 22 | 13 | 23 | 54 | 36 | 47 | 46 |
| 7 | 61 | 66 | 52 | 55 | 13 | 23 | 14 | 24 | 37 | 47 |
| 8 | 41 | 62 | 66 | 13 | 23 | 14 | 24 | 55 | 37 | 47 |
| 9 | 31 | 62 | 67 | 53 | 56 | 14 | 24 | 15 | 25 | 41 |
| 10 | 31 | 42 | 63 | 67 | 14 | 24 | 15 | 25 | 56 | 41 |
| 11 | 61 | 63 | 32 | 54 | 57 | 15 | 25 | 16 | 26 | 42 |
| 12 | 61 | 64 | 32 | 43 | 15 | 25 | 16 | 26 | 57 | 42 |
| 13 | 51 | 55 | 62 | 64 | 33 | 16 | 26 | 17 | 27 | 43 |
| 14 | 51 | 62 | 65 | 33 | 44 | 16 | 26 | 17 | 27 | 43 |

FIG. 16

SELECTIVE ADSORPTION PROCESS

BACKGROUND OF THE INVENTION

This invention relates to a process for separating gas mixtures such as hydrogen containing carbon dioxide and nitrogen impurities, by adiabatic pressure swing adsorption.

Adiabatic pressure swing adsorption processes of the type described in Batta U.S. Pat. No. 3,564,816 with four adsorbent beds and two pressure equalization stages are widely used for separating gas mixtures such as hydrogen with water, carbon dioxide, methan and carbon monoxide impurities, as for example produced in stream reforming of naphtha. In these processes at least one component is selectively adsorbed and in most instances the desired product is the unadsorbed effluent. By way of example, the Batta process is capable of yielding 99.9999% hydrogen product gas with no detectable quantities of the aforementioned impurities using four adsorbent beds each packed with an activated carbon first section and a crystalline calcium zeolite A second section.

The production rate of an adiabatic pressure swing adsorption system is of course limited by the capacity of the adsorbent beds for processing and separating the feed gas mixture. The bed capacity is limited by the maximum bed size which may be controlled by either the physical strength of the individual adsorbent particles or the permissable shipping size of adsorbent-containing vessels. It will be recognized that as-installed vessels are usually in the vertical position so that the bed height is limited by the adsorbent crushing strength.

One solution to this problem is to provide duplicate systems. By way of example, two sets of four bed systems may be used to increase an otherwise limited production rate. However, this is an expensive solution since the number of vessels is essentially doubled even if only slightly higher production is required.

An even more important limitation of prior art four bed systems is their percent recovery of hydrogen and relatively high required inventory of adsorbent.

A main object of this invention is to provide an adiabatic pressure swing adsorption process which affords higher percent recovery of unadsorbed product effluent than realized with prior art processes.

Another object is to provide an adiabatic pressure swing adsorption process which is not restricted in production rate by prior art limitations in adsorbent bed size.

Still another object is to provide an adiabatic pressure swing adsorption process which requires a smaller total volume of adsorbent vessels and a lower total quantity of adsorbent material than would be required by employing prior art systems.

Other objects of this invention will be apparent from the ensuing disclosure and appended claims.

SUMMARY

This invention relates to an adiabatic pressure swing process for selective adsorption of at least one component from a feed gas mixture.

It has been unexpectedly discovered that all of the aforedescribed objectives may be achieved in adiabatic pressure swing processes of this invention employing at least seven adsorbent beds, having at least three pressure equalization stages, at least two beds receiving feed gas mixture during the entire cycle, preferably with a feed gas to purge gas pressure ratio (PR) of at least 7 and a non-adsorbed to feed gas molar ratio (S) such that the product of PR times S is at least 6. The instant process is especially advantageous when high product gas purity is required and when the feed gas pressure is high, and also when the feed gas is hydrogen-rich and weakly adsorbed impurities such as argon, nitrogen or carbon monoxide must be selectively adsorbed.

This invention is in part based on the recognition that the desorbate profile in the adsorbent bed receiving gas is undesirably reversed in position (from the inlet to the discharge end) during less than three stage pressure equalization with the gas-discharging bed. Since the desorbate (usually an undesired impurity) in the gas discharged during pressure equalization is increasing, the receiving bed initially receives a gas with relatively little desorbate (or relatively high purity unadsorbed gas). The concentration of desorbate in this gas progressively increases as the level of pressure equalization increases. This reversing of profile is not desirable because the higher desorbate concentration gas is closest to the product end of the repressurized bed. Accordingly, when this bed is returned to the adsorption step the higher desorbate concentration gas is immediately discharged as product and this concentration becomes limiting as to the product purity. It has been unexpectedly discovered that the reversion of the desorbate profile (from the inlet to the discharge end of the bed) is substantially reduced when at least three pressure equalization stages are employed. This is illustrated by the following example:

EXAMPLE 1

The feed gas comprises the following (in mol % dry basis): hydrogen 71.2%, carbon dioxide 20.6%, methane 5.8% and carbon monoxide 2.4%. The feed gas is introduced in an activated carbon adsorbent bed at 284 psia and 98° F in the water-saturated condition. The concentration of carbon monoxide in the effluent hydrogen product gas (99.99+%) during the adsorption step and the cocurrent depressurization step is shown in Table 1.

TABLE 1

| Product Flow (Moles) | Pressure (Psia) | CO In Effluent (ppm vol) |
|---|---|---|
| start | 284 | 73 |
| 4.4 | ↓ | 57 |
| 7.8 | | 49 |
| 11.3 | | 42 |
| 14.7 | | 39 |
| 18.1 | 284 | 39 |

End of adsorption step, cocurrent depressurization starts:

| | | |
|---|---|---|
| 18.1 | 284 | 39 |
| 21.6 | 192 | 59 |
| 22.4 | 160 | 84 |
| 24.0 | 135 | 109 |
| 25.7 | 90 | 193 |

End of cocurrent depressurization, countercurrent blowdown starts.

According to Table 1, the CO concentration in the effluent product decreases from the initial 73 ppm to 39 ppm at the end of the adsorption step, the product specification being 100 ppm. As cocurrent depressurization starts, the CO concentration in the effluent rises and towards the end of this step it reaches 193 ppm. This means a moderate breakthrough of the CO adsorption front through the bed discharge end.

If one step pressure equalization is practiced, the pressures in bed 1 (the cocurrently depressurizing bed) and bed 2 (the countercurrently repressurizing bed) and the carbon monoxide concentration in the gas flowing from bed 1 to bed 2 are as follows:

TABLE 2

| Pressure (Psia) Bed 1 | Bed 2 | CO in the gas from bed 1 to bed 2 (ppm vol) |
|---|---|---|
| 284 | 21 | 39 |
| 236 | 72 | 48 |
| 192 | 119 | 59 |
| 160 | 158 | 84 |

The second bed, being equalized by gas introduced at its discharge end, initially receives a gas with little CO impurity (39 ppm) but towards the end of equalization it receives gas with substantially more CO impurity (84 ppm). This is undesirable because the second bed now has a higher impurity content at its discharge end than in a section toward its inlet end (the impurity front or profile reversion phenomenon). When this second bed is switched to the adsorption step the product purity will be initially lower. It was surprisingly found that when this second bed is switched to the adsorption step, the breakthrough of impurity occurs at the beginning rather than at the end of the adsorption step. Accordingly, to obtain a product of specified purity the bed must be designed with sufficient size to prevent a sharp breakthrough of the impurity front at the end of the cocurrent depressurization step because this would cause a breakthrough during the initial part of the adsorption step of the other bed just repressurized with the impure gas.

As previously mentioned, the gas discharged at the product end of the bed during cocurrent depressurization may be used for repressurizing other beds or for purging other beds or for both purging and repressurization. For example, in Batta U.S. Pat. No. 3,564,816, FIG. 2, the first portion of discharged gas from bed A is used to repressurize bed B (6–7 minutes), to a higher intermediate pressure, the second portion of gas, discharged from bed A (containing already more impurity) is used to purge bed C at the lowest pressure and finally last portion of gas discharged at the product end of bed A having the lowest purity is used to repressurize bed C to a lower intermediate pressure. This is not the most advantageous way to use the gas discharged from bed A, because the repressurization of bed C starts with a very impure gas. Instead, the lowest purity gas, discharged towards the end of cocurrent depressurization is used most effectively for the purging of another bed at the lowest pressure. This possibility is described in connection with FIG. 5 of the same Batta patent, U.S. Pat. No. 3,564,816. The following general principle may therefore be stated: When a gas is discharged from one bed with varying impurity level and this gas is used to purge and repressurize other beds, the most impure gas should be introduced to the other beds at the lowest pressure (for purging) and the purest discharged gas introduced at the highest intermediate pressure (for repressurization).

In order to show the effect of profile reversion, the following cases shall now be compared based on the FIG. 17 graphs, all using Example 1 feed gas. The bed being depressurized is the dash-dot curve and the bed being repressurized is the solid line curve; the upper abscissa is the repressurizing bed and the lower abscissa is the depressurizing bed.

Case a: one step pressure equalization process, Wagner U.S. Pat. No. 3,430,418;

Case b: two step equalization process, one after providing purge (FIG. 2 of the Batta patent);

Case c: two equalization processes, both equalizations before providing purge (FIG. 5 of the Batta patent);

Case d: three equalizations, all before providing purge (FIG. 2 of this invention). For simplicity, the same cocurrent depressurization pressure of 90 psia, purge of 3.3 moles, highest equalization pressure flow of repressurized bed (158 psia) will be taken in all four cases with an adsorbent bed size of 21 cu. ft.

FIG. 17 shows that the impurity profile reversion is most detrimental in case *b*, slightly less serious in case *a*, improved in case *c* and substantially avoided in case *d* with three pressure equalizations pursuant to this invention. The impurity profile reversion may be completely avoided by still more pressure equalizations and purge steps. In such a case the mass transfer front would be pushed out from the product end of the adsorbent bed and the latter utilized most completely.

Cases *a* through *d* of FIG. 17 may also be compared from the standpoint of utilization of the adsorbent beds. In case *c*, each one of the beds is isolated during a portion of the cycle and therefore doing no useful work. This has the consequence that about 20% more adsorbent is needed for the same production rate than in cases *a* or *b*, and about 25% more adsorbent than in case *d* (the FIG. 2 embodiment of this invention). Accordingly, the latter permits at least 5% less adsorbent than the prior art two step pressure equalization systems.

Returning now to Example I, when three pressure equalization stages are provided according to this invention, each bed is repressurized first with a gas containing 67–84 ppm CO to the third (and lowest) equalization pressure of about 60 psia. The partially repressurized bed is repressurized secondly with a gas containing 53–67 ppm CO to the second equalization pressure of about 100 psia., and then further repressurized with a gas containing 37–53 ppm CO to the highest equalization pressure of 158 psia. In contrast to single stage pressure equalization, the highest purity gas is introduced to the repressurizing second bed discharge end during the final part of the pressure equalization and the lowest purity gas is pushed deeper into the bed where the impurity adsorption front passes during the adsorption step. During the succeeding adsorption step the initially discharged product gas is high purity and the impurity adsorption front moves towards the discharge end in the conventional manner.

There are several methods for utilizing this advantage. For example, the adsorption step may be extended for a longer period to achieve a more pronounced breakthrough of the impurity adsorption front while still maintaining the same product gas purity, thereby increasing the production rate per cycle. Alternatively, a smaller adsorbent bed may be used for the same production rate. Still another variation is to terminate the adsorption step at the same concentration level of the impurity adsorption front, but realize a higher product purity by avoidance of the aforedescribed position reversal of the impurity adsorption front.

In summary this invention generally relates to an adiabatic pressure swing process for separation of gas mixtures by selectively adsorbing at least one gas component in each of multiple adsorbent beds by the cycle of introducing feed gas mixture to the bed inlet end at first highest superatmospheric pressure and discharging unadsorbed product effluent from the bed discharge end. Initial void space gas is released from the bed discharge end and introduced to the discharge end of another adsorbent bed previously purged of the one component and initially at lowest pressure until the two beds are pressure equalized at higher intermediate pressure. Gas is released from the bed inlet end for countercurrent blowdown to lowest pressure. Onecomponent depleted gas from another adsorbent bed is introduced to the bed discharge end for desorption of the one component and purging through the bed inlet end. The purged bed is repressurized to the first highest superatmospheric pressure and the cycle is thereafter repeated.

More particularly, there are at least seven adsorbent beds and feed gas mixture is simultaneously introduced to the inlet ends of at least two adsorbent beds in overlapping identical cycle sequentially from the first to the highest numbered bed with the sequence thereafter continuously repeated such that during the initial period of a bed adsorption step the immediately preceding lower numbered bed is also on its adsorption step and during the last period the immediately following higher numbered bed is also on its adsorption step.

The initial void space gas releasing-pressure equalization is performed in at least three separate phases comprising first pressure equalizing the adsorbent bed having completed its one component adsorption step, with a different previously purged and at least third higher numbered bed initially at lower intermediate pressure so that the two beds are finally at a first equalization pressure. The same adsorbent bed now at the first equalization pressure is second pressure equalized with a still different previously purged and at least fourth higher numbered bed initially at still lower intermediate pressure so that the two beds are finally at a second equalization pressure. The adsorbent bed initially at the last-mentioned pressure is third pressure equalized with another previously purged and at least fifth higher numbered bed initially at lowest pressure so that the two beds are finally at a third equalization pressure.

BRIEF DESCRIPTION OF THE DRAWINGS

FIG. 3 is a valve time chart for the FIG. 2 cycle showing the opened valves of the FIG. 1 apparatus.

FIG. 7 is a valve time chart for the FIG. 6 cycle showing the opened valves of the FIG. 5 apparatus

FIG. 9 is a cycle chart for the various steps of an eight bed, three pressure equalization embodiment which can be practiced with the FIG. 8 apparatus.

FIG. 10 is a valve time chart for the FIG. 9 cycle showing the opened valves of the FIG. 8 apparatus.

FIG. 12 is a cycle chart for the various steps of an eight bed, four pressure equalization embodiment which can be practiced with the FIG. 11 apparatus.

FIG. 13 is a valve time chart for the FIG. 12 cycle showing the opened valves of the FIG. 11 apparatus.

FIG. 16 is a valve time chart for the FIG. 15 cycle showing the opened valves of the FIG. 14 apparatus.

DESCRIPTION OF PREFERRED EMBODIMENTS

The invention is useful for separation of any gas mixture using adsorbent in which at least one component of the gas mixture is selectively adsorbed in the gas phase and thereafter desorbed in the gas phase at the concentration, temperature and pressure of the purge step. It is particularly useful for separation of gas mixtures having hydrogen as the major component with at least one of the following as minor components to be removed as undesired impurities: CO, $CO_2$, light saturated and unsaturated hydrocarbons, aromatics, light sulphur compounds, argon, nitrogen and water. However, the invention may also be advantageous employed to reduce adsorbent inventory in air separation or methane purification.

As previously stated, in a preferred embodiment, the absolute pressure ratio (PR) of the first highest superatmospheric pressure of the adsorption step to the lowest pressure of the process (at which purging is performed) is at least 7, and the product of this ratio times the molar ratio (S) of the non-adsorbates in the bed at the end of the adsorption step to the feed gas introduced during such adsorption step is at least 6. By way of explanation, at the end of the adsorption step in adiabatic pressure swing processes, the adsorbent bed contains a certain quantity of non-adsorbed component, mainly in the void space between adsorbent particles, e.g., hydrogen. This quantity, expressed in moles, divided by the moles of feed gas introduced to the bed during the adsorption step is the aforementioned molar ratio S. In most commercial practice the molar ratio S is between 0.35 and 0.85.

The non-adsorbed gas released from the bed discharge end following the adsorption step may be used for pressure equalization and/or purging of other beds. Then during the ensuing countercurrent blowdown step, a further quantity of gas (including both non-adsorbed and desorbate) is released at the bed inlet end and a still further quantity of both non-adsorbate and adsorbate gas remain in the relatively high if the adsorption to purge pressure ratio PR is relatively low. Thus, when PR is relatively low a smaller portion of the non-adsorbates are available for purging and pressure equalizing other beds.

Another important relationship is that relatively low pressure ratio PR requires use of a relatively large part of the released non-adsorbed gas for purging other beds and under these circumstances a relatively small part of this gas is available for repressurization of and pressure equalization with other beds. If very little gas is available for pressure equalization, conducting the latter in at least three steps (pursuant to this invention) does not increase recovery of unadsorbed product gas.

Figure 18:
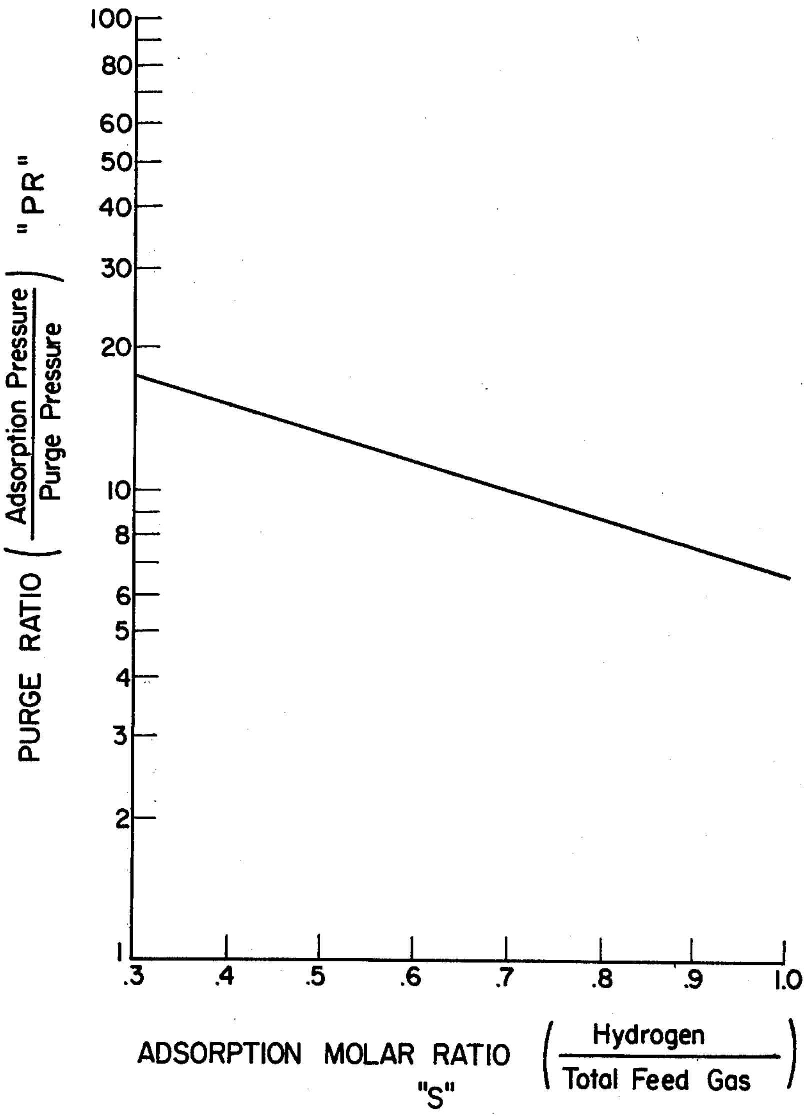
FIG. 18 is a graph showing the relationship between the pressure ratio (PR) and the molar ratio (S) for hydrogen-rich feed gas for this invention and prior art practice.

These relationships are graphically illustrated in FIG. 18, based on adiabatic pressure swing processes for hydrogen purification with zeolitic molecular sieve-activated carbon adsorbent. The ordinate is the aforementioned pressure ratio (PR) and the abscissa is molar ratio S, i.e., hydrogen in bed at end of the adsorption step/total feed gas mixture entering during the adsorption step. The straight line identifies the minimum PR and S values required to practice the preferred embodiment of this invention with PR of at least 7 and the product of PR times S of at least 6. By way of illustration, if the PR is 11 then S should be at least (6/11) = 0.55.

It should be understood that when pressure equalization is practiced between two adsorbent beds, there will be a slight pressure difference between the depressurizing and repressurizing beds due to pressure drop in conduits and valves. Accordingly, the depressurizing bed will normally be at slightly higher pressure than the repressurizing bed when the step is completed.

Figure 1:
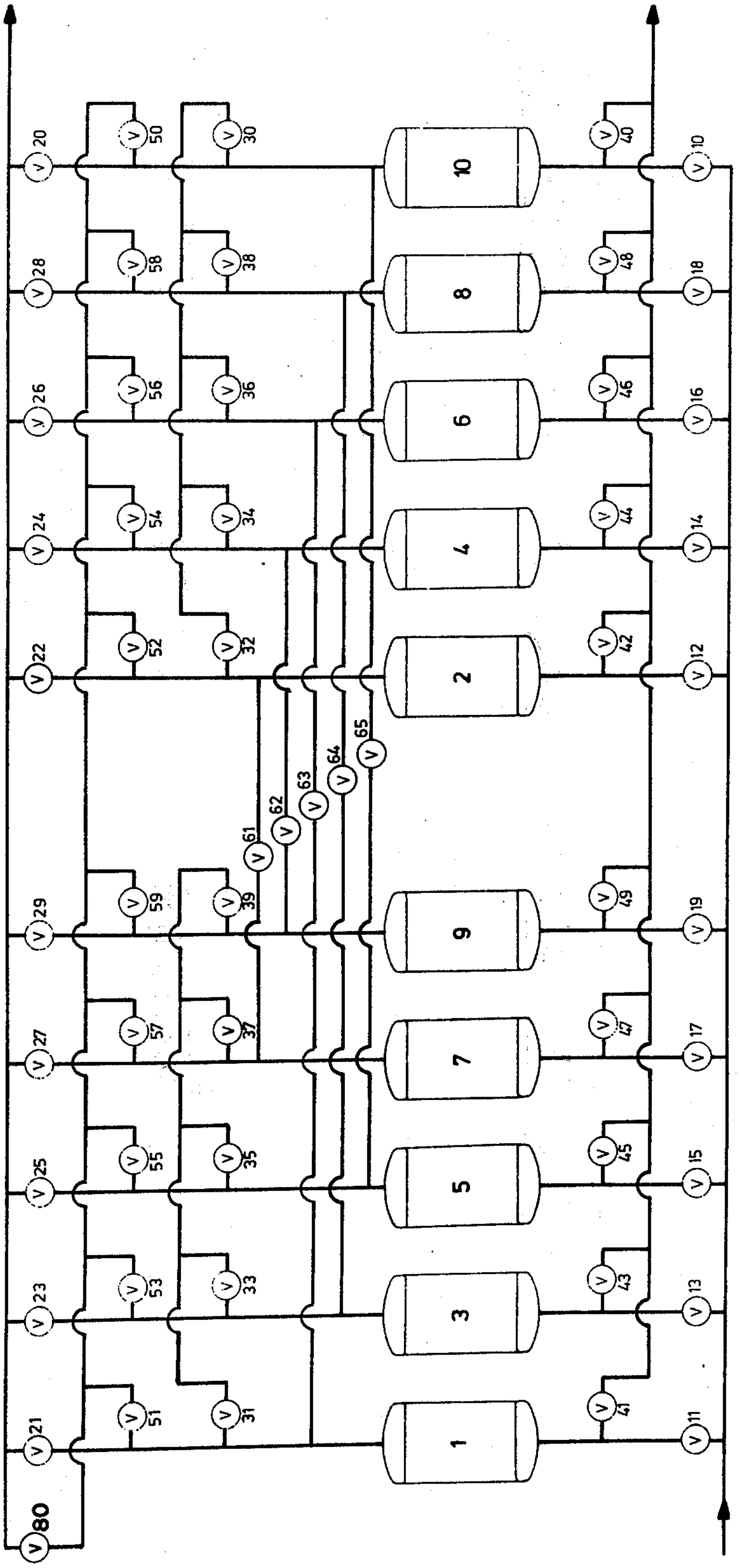
FIG. 1 is a schematic flowsheet of apparatus suitable for practicing the inventive process with ten adsorbent beds.

Referring now to the drawings, FIG. 1 shows ten adsorbent beds 1–10 connected in parallel flow relation between the feed gas manifold having inlet valves 11–19, 10 respectively and the unadsorbed product effluent manifold having product valves 21–29, 20 respectively. The third (lowest) stage pressure equalization manifold is located between the adsorbent bed discharge ends and the product valves 21–29, 20 for beds 1–10 respectively, and is provided with third stage equalization and purge valves 31–39, 30 respectively. The waste gas manifold is located between the adsorbent bed inlet ends and the inlet valves 11–19, 10 for beds 1–10 respectively, and is provided with waste valves 41–49, 40 respectively. The first (highest) stage pressure equalization-repressurization manifold is located between the unadsorbed product effluent manifold and the third stage pressure equalization-purge manifold, and is provided with first stage equalization valves 51–59, 50 for beds 1–10 respectively. Gas flow regulator 80 is provided in the conduit joining the first stage pressure equalization-repressurization manifold and the product manifold.

A common manifold for the second (intermediate) stage manifold is not used but instead individual conduits are provided to join the discharge ends of adsorbent beds. More particularly, a manifold joins beds 2 and 7 with valve 61 therein, a manifold joins beds 4 and 9 with valve 62 therein, a manifold joins beds 3 and 6 with valve 63 therein, a manifold joins beds 5 and 8 with valve 64 therein, and a manifold joins beds 5 and 10 with valve 65 therein.

For ease in identifying the correspondence between beds 1 – 10 and valves 11 – 59, the valves have usually been assigned identification numbers having a final digit which is the same as the number of the adsorbent bed which is directly controlled by the valves. By way of example, the valves directly controlling the operation of bed 3 are nos. 13, 23, 33, 43 and 53. The only exception to this correspondence are the valves directly controlling the operation of bed 10 which are nos. 10, 20, 30, 40 and 50.

Figure 2:
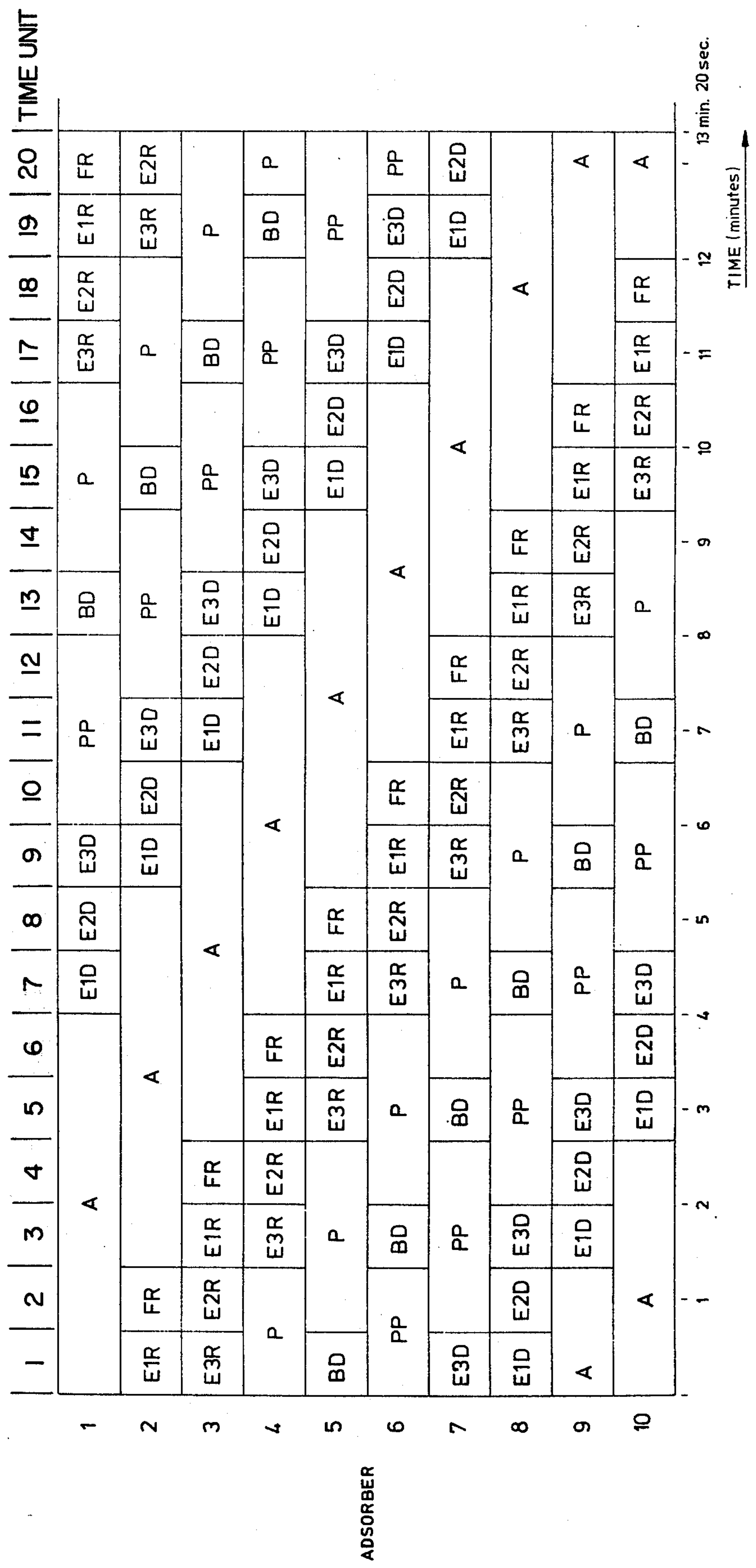
FIG. 2 is a preferred cycle chart for the various steps of a ten bed embodiment which can be practiced with the FIG. 1 apparatus.

FIG. 2 is a preferred cycle and time program for use with the FIG. 1 apparatus based on a total cycle time of about 13 minutes, 20 seconds per the bottom abscissa. The sequential steps of the cycle and their designations on the chart are as follows: adsorption (A), first stage pressure equalization — depressurization (E1D), second stage pressure equalization — depressurization (E2D), third stage pressure equalization — depressurization (E3D), cocurrent depressurization providing purge gas (PP), countercurrent blowdown (BD), purge (P), third stage pressure equalization - repressurization (E3R), second stage pressure equalization - repressurization (E2R), first stage pressure equalization - repressurization (E1R), and final repressurization to the feed gas pressure by product gas introduction at the product discharge end (FR).

It should be noted that at any point in the cycle, three adsorbent beds are receiving feed gas mixture and delivering unadsorbed product effluent gas at the feed pressure. By way of example, after 4 time units, each of adsorbers 1, 2 and 3 is processing feed gas.

FIG. 3 lists the open valves during each of twenty time units in which the FIG. 2 cycle may be divided per the top abscissa. By way of illustration, during the 1st time unit feed gas is flowing through inlet valves 10, 11 and 19 for selective adsorption of at least one component in each of adsorbent beds 10, 1 and 9 respectively. Product gas is discharged therefrom at first highest superatmospheric pressure into the product manifold through product valves 20, 21 and 29 respectively. Purge gas is entering the bed 4 discharge end through purge valve 34 and is being supplied thereto through the purge gas manifold by cocurrent depressurization gas released from the discharge end of bed 6 through valve 36. At the same time countercurrent blowdown gas is released from the bed 5 inlet end through waste valve 45 and released to the environment through the waste gas manifold. Bed 2 is being repressurized to its (highest intermediate) first stage equalization pressure by introduction of gas through valve 52 to its discharge end. The gas for the latter is supplied by bed 8 which is being first stage pressure equalized by release of gas from its discharge end through valve 58 to the first stage pressure equalization — repressurization manifold. Bed 3 is being repressurized to its third stage equalization pressure by introduction of gas through valve 33 to its discharge end. The gas for the latter is supplied by bed 7 which is being third pressure equalized by release of gas from its discharge end through valve 37.

It should be noted that during the 1st time unit, none of the adsorbent beds are being second stage pressure equalized so none of the valve group 61 – 65 are open. However, during the 2nd time unit beds 3 and 8 are second stage pressure equalized with bed 3 receiving gas from bed 8 through valve 64.

A ten bed embodiment of the invention as illustrated in FIGS. 1–3 will be more fully understood by the following examples:

EXAMPLE 2

The feed gas comprises the following in mol % (dry basis): hydrogen 77.1%, carbon dioxide 22.5%, carbon monoxide 0.35% and methane 0.013%. The feed gas is introduced to a system comprising ten adsorbent beds each containing 1220 cubic ft. activated carbon in a first zone or layer at the feed inlet end and 380 cubic ft. calcium zeolite A molecular sieve in a second zone downstream of the activated carbon zone and extending to the product discharge end. The feed gas is introduced at 305 psia and 70° F, and flow rate of 60,330,000 cubic ft./day. Product gas comprising at least 99.999% hydrogen is discharged at flow rate of 40,000,000 cubic ft./day (both measured at 1 atm. pressure and 60° F). On this basis, about 86% of the hydrogen in the feed gas is recovered as product gas.

Figure 4A:
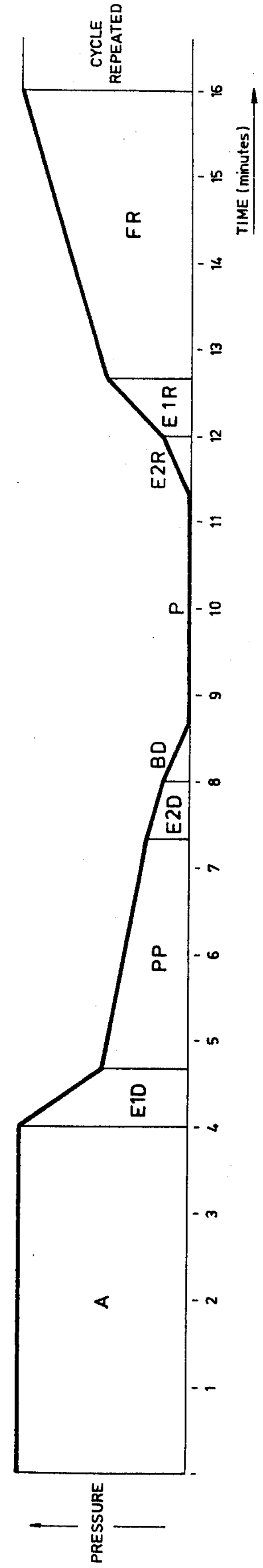
FIGS. 4*a* and *b* is a pair of pressure-time diagrams comparing the FIGS. 2–3 embodiment with a four bed system of Batta U.S. Pat. No. 3,564,816.
Figure 4B:
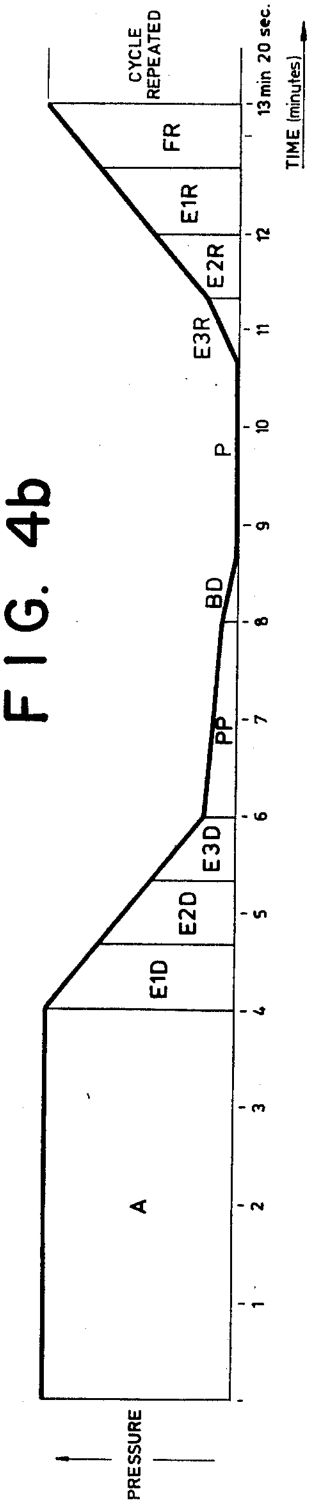

The total cycle time is 13 minutes, 20 seconds with the pressure-time relationship for the various steps illustrated in FIG. 4*b*. More particularly, the steps, duration and terminal pressures in each bed as it passes through the cycle are as follows:

| Step | Duration (Seconds) | Terminal Pressure (Psia.) |
|---|---|---|
| Adsorption (A) | 240 | 305 |
| 1st equal - depres. (E1D) | 40 | 255 |
| 2nd equal. - depres. (E2D) | 40 | 162 |
| 3rd equal. - depres. (E3D) | 40 | 83 |
| cocur. - depres. (PP) | 120 | 41 |
| counter. - blowdn. (BD) | 40 | 15 |
| purge (P) | 120 | 15 |
| 3rd equal. repres. (E3R) | 40 | 83 |
| 2nd equal. - repres. (E2R) | 40 | 162 |
| 1st equal. - depres. (E1D) | 40 | 255 |
| final rep. w/ prod. gas (FR) | 40 | 305 |

The pressure ratio (PR) is 305/15 = 20.3, the molar ratio (S) is 0.47 so that the product PR times S is 9.5. It will be noted that in the above example, all steps with the exception of adsorption, cocurrent depressurization and purge are of equal duration, but this is not essential. For example, process steps E1D, E3D, BD, E3R, and E1R could have a duration of 30 seconds, E2D and FR 50 seconds, PP and P 130 seconds, and adsorption (A) 240 seconds.

EXAMPLE 3

The feed gas comprises the following in mol % (dry basis): hydrogen 75%, nitrogen 25%, and less than 500 ppm. ammonia. The feed gas (dry) is introduced to a system comprising ten adsorbent beds each containing 1800 cu. ft. calcium zeolite A at 305 psia. and 40° F at flow rate of 62,750,000 cu. ft./day and product gas comprising at least 99.999% hydrogen is discharged at flow rate of 40,000,000 cu. ft./day. On this basis, about 85% of the hydrogen in the feed gas is recovered as product gas. The total cycle is 13 minutes, 20 seconds with terminal pressures of the various steps as follows in psia.: E1D and E1R = 253, E2D and E2R = 159, E3D and E3R = 81, PP = 43, BD and P = 15. The PR is again 20.3, S is 0.58 so that the product PR times S is 11.8.

EXAMPLE 4

In this example, the aforedescribed Examples 2 and 3 are compared with the two step pressure equalization system of Batta U.S. Pat. No. 3,564,816 with four adsorbent beds of the same material, to produce 40,000,000 cu. ft./day of 99.999% hydrogen gas from the same feed gas mixtures: For Example 2:

| | This Invention | Prior Art | Percent Improvement |
|---|---|---|---|
| Percent $H_2$ in feed recovered as product | 86 | 81 | 6.2 |
| Quantity of Feed Gas | 60,330,000 | 64,050,000 | 6.2 |
| Total Adsorbent Quantity, cu. ft. | 16,000 | 18,180 | 12.0 |

For Example 3:

| | This Invention | Prior Art | Percent Improvement |
|---|---|---|---|
| Percent $H_2$ in feed recovered as product | 85 | 79.7 | 6.6 |
| Quantity of Feed Gas | 62,750,000 | 66,920,000 | 6.6 |
| Total Adsorbent Quantity, cu. ft. | 18,000 | 20,010 | 10.0 |

Example 4 demonstrates important advantages over a prior art two-step pressure equalization system of the Batta type and based on three sets of four bed systems operating in parallel flow relation, i.e., without interconnecting piping. For high production rates of the order of magnitude to which this invention is especially suited, the adsorbent and the enclosing vessels with structural supports are the major equipment and comprise 70 – 80% of the total investment cost. Accordingly, this invention offers substantial equipment savings, i.e., two fewer vessels and associated piping, valves and supports.

The FIG. 4 comparison shows that the total regeneration time, i.e., that required to purge and repressure for reintroduction of feed gas, may be substantially reduced by the practice of this invention. This of course means that the adsorbent is used more effectively. For example, FIG. 4 shows that on the same adsorption step time, the total cycle time of the ten bed embodiment is 16.5% shorter than a comparable four bed system employing two step pressure equalization (FIG. 4*a*).

Shorter cycle time reduces the required quantity of adsorbent. Less adsorbent is also required to produce the same quantity of product because of higher product recovery efficiency, hence lower adsorption of impurities. Accordingly, the adsorbent requirements are very substantially reduced, i.e., 12.0% and 10.0% for the Example 2 and 3 feed gases respectively.

Figure 5:
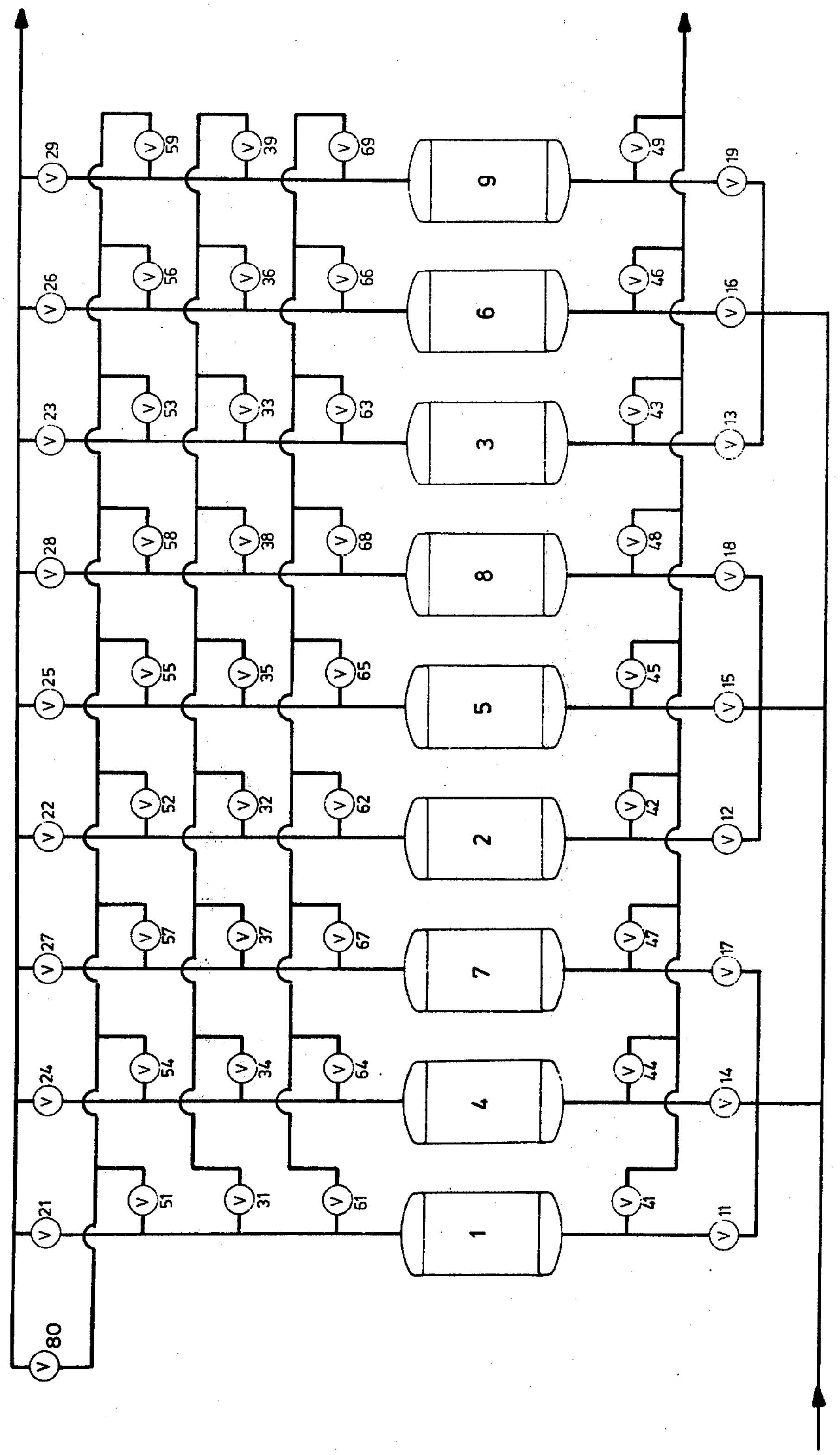
FIG. 5 is a schematic flowsheet of apparatus suitable for practicing the inventive process with nine adsorbent beds.
Figure 6:
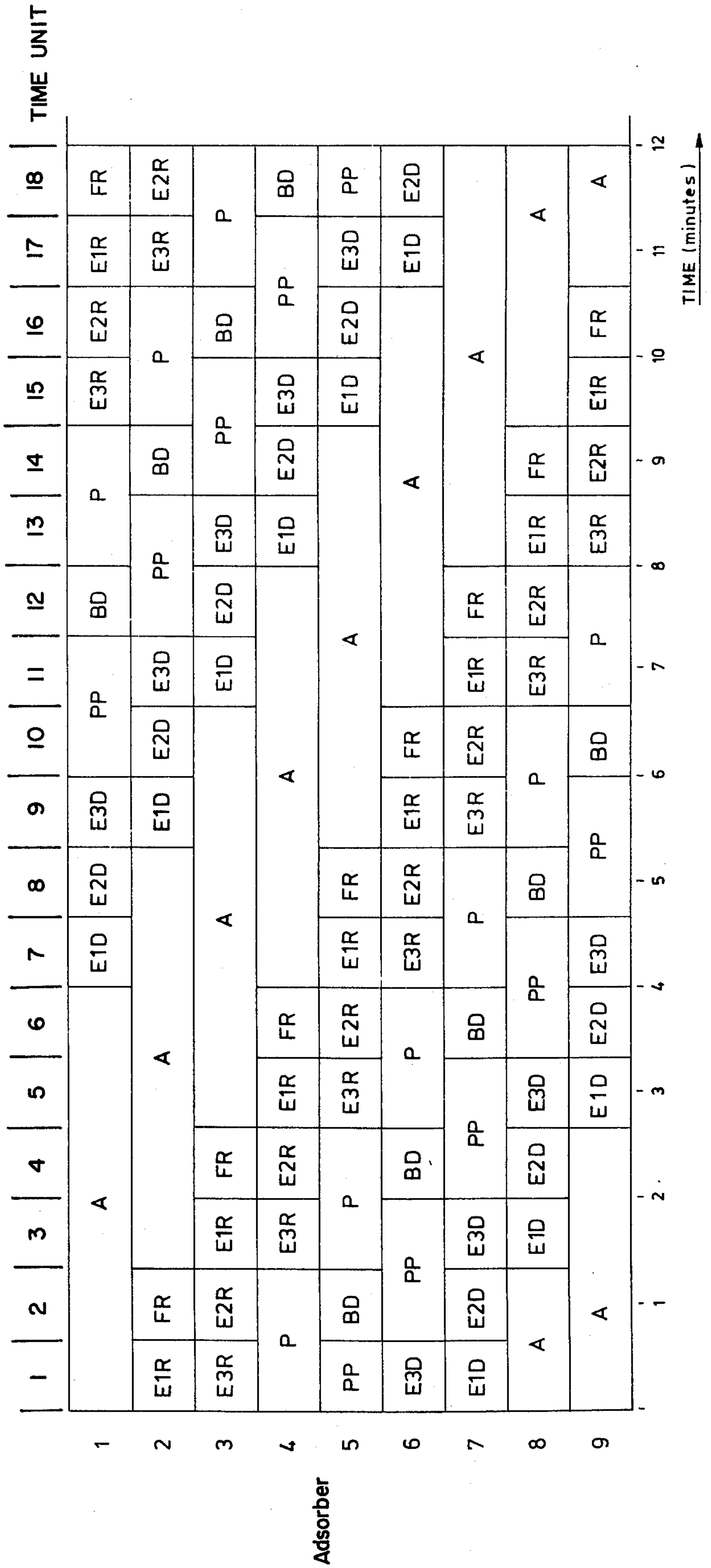
FIG. 6 is a cycle chart for the various steps of a nine bed embodiment which can be practiced with the FIG. 5 apparatus.

The nine bed embodiment of FIGS. 5 – 7 is quite similar to the previously described ten bed embodiment of FIGS. 1–3, but differs in certain minor particulars: One less adsorbent vessel is employed (an advantage) but it requires a shorter purge time which might be a disadvantage when the selectively adsorbed components are difficult to remove or are present in relatively large quantities, or both. By way of comparison, the FIG. 2 ten bed purge time is about 120 seconds whereas the nine bed FIG. 6 nine bed purge time is about 80 seconds.

In a preferred embodiment of the invention exemplified by the FIG. 2 and 6 cycle charts, at least nine adsorbent beds are provided in overlapping identical cycles such that during the initial period of a bed adsorption step the two immediately preceding lower numbered beds are also in their adsorption steps. During the middle period of a bed adsorption step the immediately preceding lower numbered and immediately following higher numbered beds are also on their adsorption steps. During the last period of a bed adsorption step the two immediately following higher numbered beds are also on their adsorption steps. By way of illustration and referring to FIG. 2, the adsorption step of bed 1 comprises six time units so that units represent the initial period, units 3 and 4 are the middle period, and units 5 and 6 are the last period of the adsorption step. During the initial period, beds 9 and 10 (the two beds immediately preceding bed 1) are also on their adsorption steps, during the middle period beds 10 (immediately preceding) and 2 (immediately following) are on their adsorption steps and during the last period beds 2 and 3 (the two immediately following numbered beds) are also on their adsorption steps.

In another preferred embodiment of the invention also exemplified by the FIG. 2 and 6 cycle charts, the initial void space gas releasing-pressure equalization is performed in three separate phases comprising first pressure equalizing an adsorbent bed having completed its adsorption step with the fourth higher numbered adsorbent bed initially at a second equalization pressure so that the two beds are finally at a first equalization pressure. The same adsorbent bed having been depressurized to the first equalization pressure is now second pressure equalized with the fifth higher numbered adsorbent bed initially at the third equalization pressure so that the two beds are finally at said second equalization pressure. The same adsorbent bed having been depressurized to the second equalization pressure is now third pressure equalized with the sixth higher numbered adsorbent bed initially at the lowest pressure of the process so that these two beds are finally at the third equalization pressure. The same adsorbent bed having been depressurized to the third equalization pressure is now further depressurized cocurrently and the released gas is at least in part used to purge the eighth higher numbered adsorbent bed at the lowest pressure. It will be noted in this respect that in the FIG. 1–2 ten bed embodiment, this gas is first used to purge both the seventh and the eighth higher numbered beds, then only the eighth bed, and finally both the eighth and ninth higher numbered beds. In the FIG. 5–6 nine bed embodiment the released gas is first used to purge only the seventh higher numbered bed and then purge only the eighth higher numbered bed. After the aforedescribed further cocurrent depressurization step the same adsorbent bed is countercurrently blown down to the lowest pressure and thereafter purged.

Using FIG. 2 to illustrate the aforedescribed relationships between the bed experiencing the initial void space gas releasing step and other beds being pressure equalized (by repressurization) therewith, the first phase of the bed 1 initial void space gas releasing (E1D) occurs during time unit 7 and is performed with bed 5, the fourth higher numbered adsorption bed, during its highest repressurization by pressure equalization phase (E1R). The second phase of the bed 1 initial void space gas releasing (E2D) occurs during time unit 8 and is performed with bed 6, the fifth higher numbered adsorption bed, during its intermediate repressurization by pressure equalization phase (E2R). The third phase of the bed 1 initial void space gas releasing (E3D) occurs during time unit 9 and is performed with bed 7, the sixth higher numbered adsorption bed, during its lowest represurization of pressure equalization phase (E3R). The final cocurrent depressurization (PP) of bed 1 occurs during time unit 10, 11 and 12, and the so-released gas is used for purging bed 9, the eighth higher numbered adsorption bed, during its entire purge phase (P).

It should be understood that in the aforedefined relationship when the so-calculated higher bed number exceeds the actual number of adsorbent beds in a particular system, the actual number must be subtracted from the calculated number to identify the designated "higher number adsorbent bed". By way of example, consider the third pressure equalization of bed 6 which is with the sixth higher numbered adsorbent bed during time unit 19. Since in the FIGS. 1–3 embodiment there are ten adsorbent beds, the designated bed for E3R is 12 - 10 or bed 2.

Figure 8:
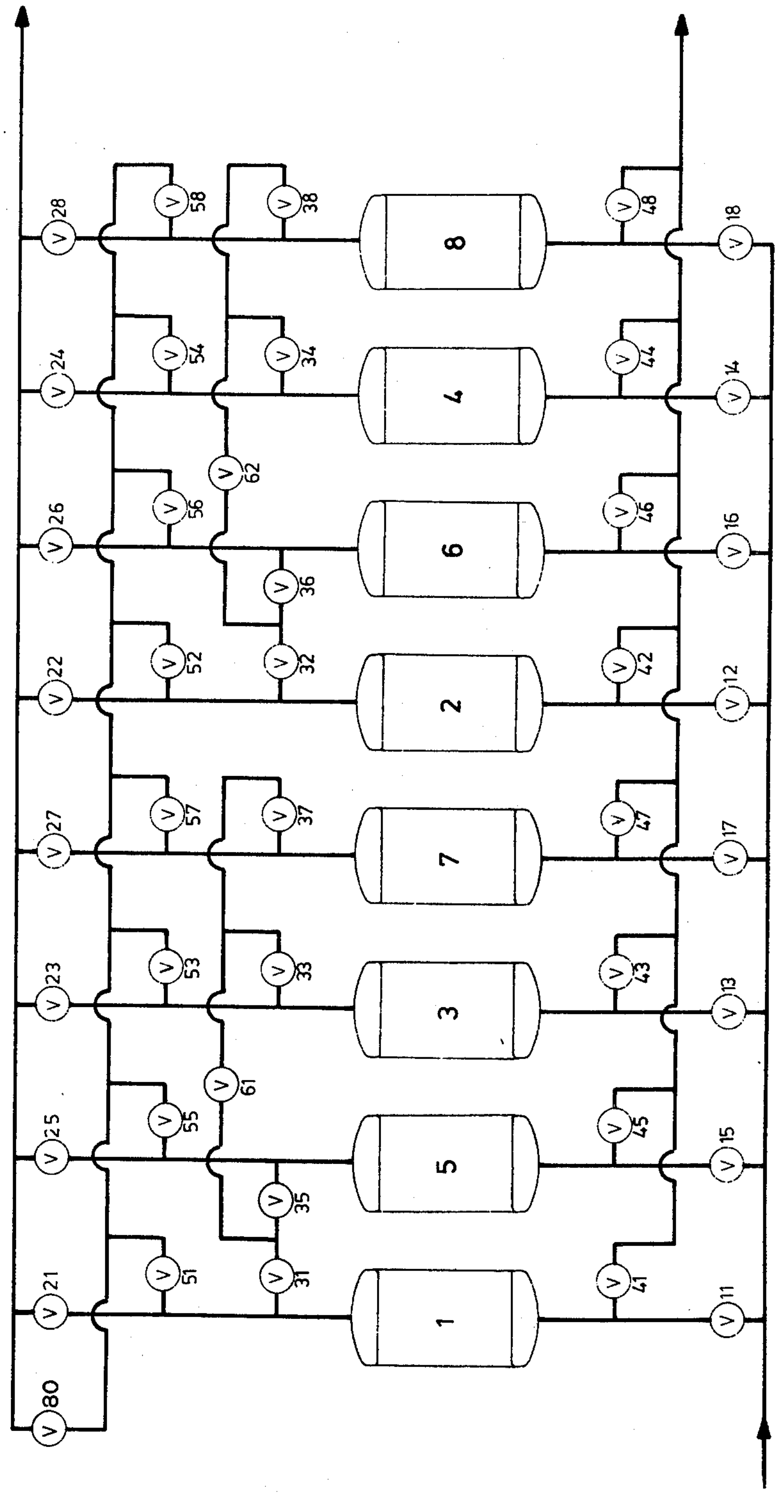
FIG. 8 is a schematic flowsheet of apparatus suitable for practicing the inventive process with eight adsorbent beds using three pressure equalization stages.

In the eight bed embodiment of FIGS. 8–10, two rather than three adsorbent beds are receiving feed gas mixture at any given time. By way of example, during the initial period time units 1 and 2 of bed 1, bed 8 (the immediately preceeding lower numbered bed) is on its adsorption step. Then during the last period time units 3 and 4 of bed 1, bed 2 (the immediately following higher numbered bed) is on its adsorption step. Since in this embodiment the ratio of "on stream" adsorbent to total adsorbent is lower than the previously described embodiments, the adsorbent utilization for the former is lower but still superior to prior art systems.

Another distinction of the FIGS. 8–10 eight bed embodiment is that even though three pressure equalizations are practiced, they are not consecutive. Considering again FIG. 9 and bed 1, its first pressure equalization E1D is with bed 4 (the third higher numbered bed) followed immediately by second pressure equalization E2D with bed 5 (the fourth higher numbered bed). However the latter step is followed by cocurrent depressurization PP wherein the released gas from bed 1 is introduced at the discharge end of bed 7 (the sixth higher numbered bed) for purging thereof at the lowest pressure. The third pressure equalization E3D follows PP and is also performed with the now purged bed 7.

Valves 61 and 62 in the purge manifolds of FIG. 8 8 are not essential and their function of controlling flow rates for the second and third pressure equalizations may be performed by controlled opening of valves 31–38.

Figure 11:
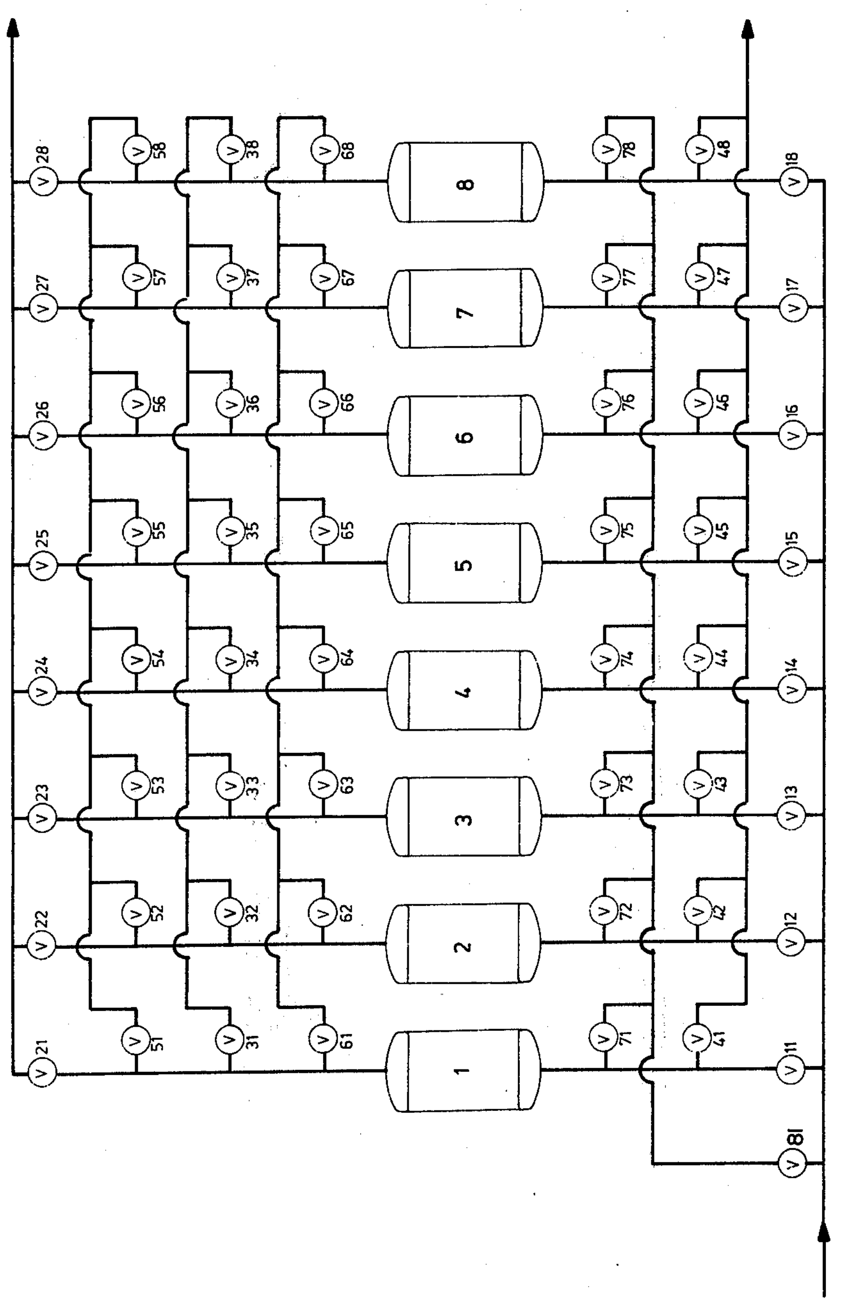
FIG. 11 is a schematic flowsheet of apparatus suitable for practicing the inventive process with eight adsorbent beds using four pressure equalization stages.

The eight bed embodiment of FIGS. 11–13 differs from the previously described embodiments by the use of four pressure equalization steps hence higher recovery of product gas but with more complex piping and more valves as shown in FIG. 11. In particular, valves 71–78 are needed at the inlet ends of beds 1 – 8 respectively to accommodate the additional flows of feed gas for the final repressurization (FR) of each bed having been repressurized to the first equalization level (E1R). By way of example, bed 2 is finally repressurized during time unit 2 by opening valve 72 thereby flowing feed gas through valve 81 to the bed inlet end. In the previously illustrated embodiments final repressurization was achieved by product gas introduced at the bed discharge end.

FIG. 12 shows that during the first pressure equalization E1D each bed transfers gas to the third higher numbered bed (E1R), during the second pressure equalization E2D each bed transfers gas to the fourth higher numbered bed (E2R), during the third pressure equalization E3D each bed transfers gas to the fifth higher numbered bed (E3R), and during the fourth pressure equalization (E4D) each bed transfers gas to the sixth higher numbered bed (E4R). In this embodiment the four pressure equalizations are consecutive and precede the cocurrent depressurization PP. Four pressure equalizations are advantageous when the pressure ratio of feed gas to purge gas is relatively high, i.e., at least 10.

Figure 14:
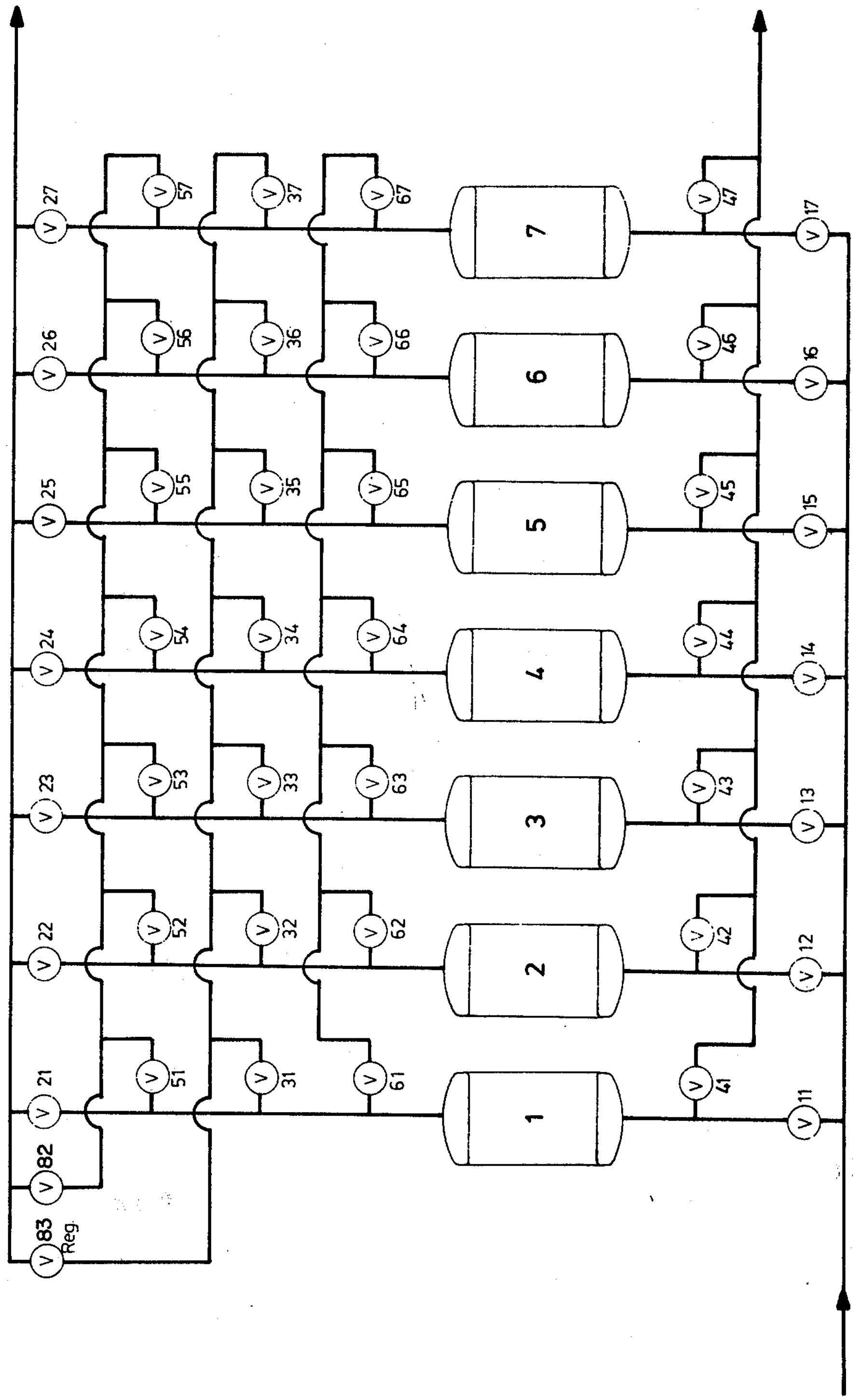
FIG. 14 is a schematic flowsheet of apparatus suitable for practicing the inventive process with seven adsorbent beds.
Figure 15:
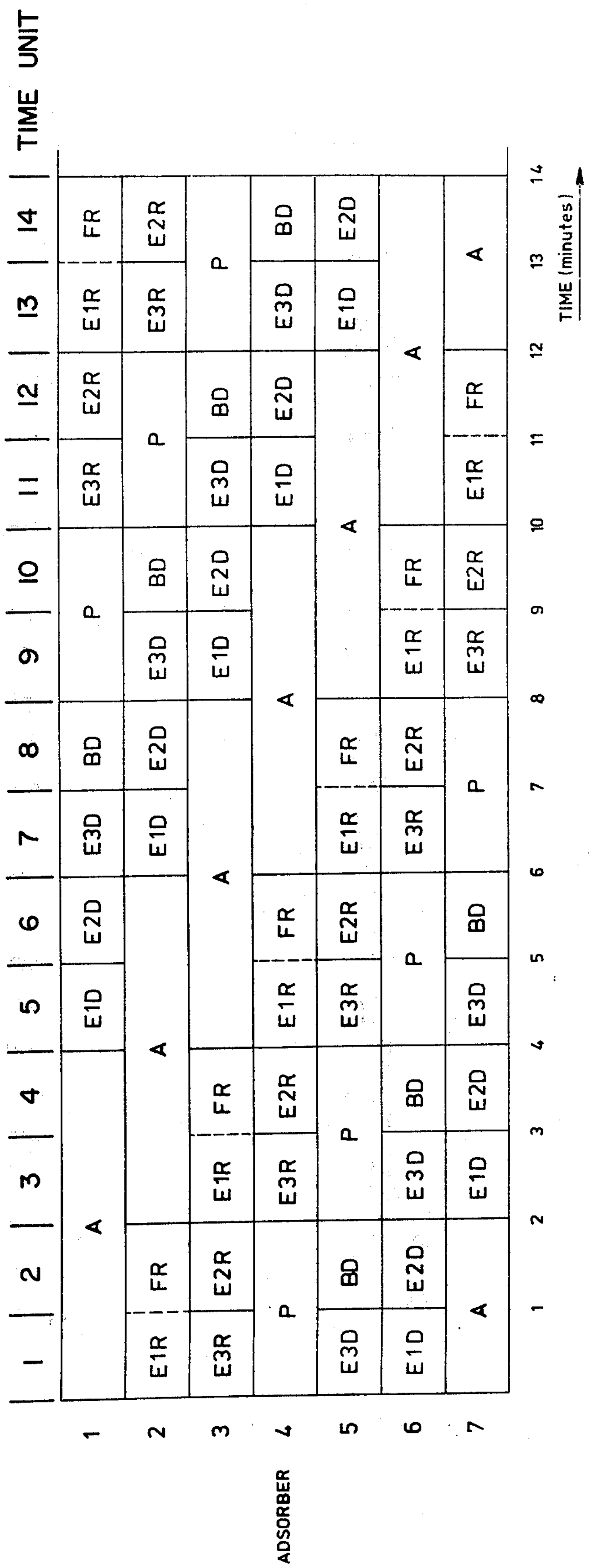
FIG. 15 is a cycle chart for the various steps of a seven bed embodiment which can be practiced with the FIG. 14 apparatus.
Figure 17A:
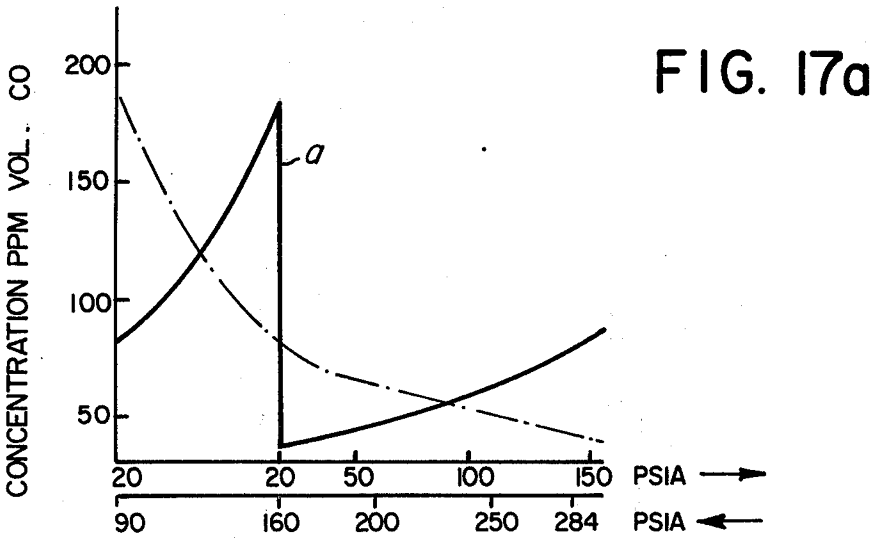
FIGS. 17*a-c* is a series of graphs showing the relationship between impurity (CO) concentration as a function of pressure in adsorbent beds being pressure equalized and purged.
Figure 17B:
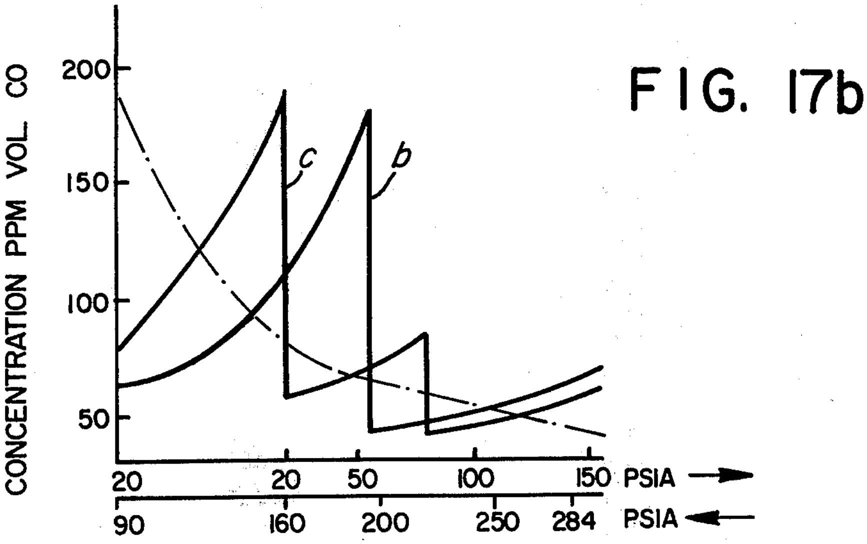
Figure 17C:
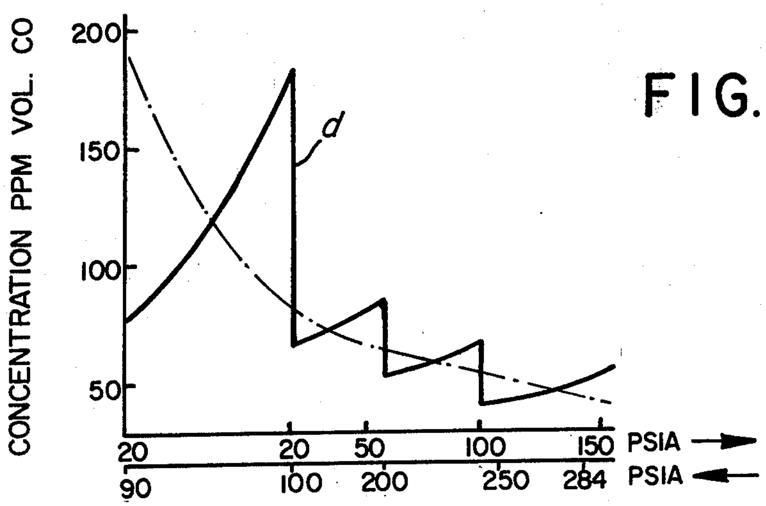

The seven bed embodiment of FIGS. 14–16 illustrates several additional modifications of the invention. Instead of using cocurrent depressurization gas for purging, this PP step is eliminated and product gas is instead used. An advantage is that bed sizes may be reduced since the impurity adsorption front advance associated with cocurrent depressurization is eliminated. However the percent recovery of product is lower, not only because of that used for purging but also because the countercurrent blowdown is started at a relatively higher pressure.

Although not illustrated, the gas released from the discharge end during the pressure equalization steps may be used in part for purging. By way of example, in the FIG. 14–16 embodiment this variation may be practiced to provide the needed purge gas without reintroducing the cocurrent depressurization step. The only needed valving - piping change in FIG. 14 is to move regulator 83 to join the pressure equalization manifold for valves 61–67 rather than the product manifold for valves 21–27. In FIG. 15, the time units for each second and third pressure equalization E2D and E3D would also include cocurrent depressurization for purge gas PP and no changes would be needed in valve time chart FIG. 16. In generic terms, the gas released from a bed discharge end during its E2D would be in part introduced to the fifth higher number adsorption bed for purging thereof, and the gas released from a bed discharge end during its E3D would be in part introduced to the sixth higher number adsorption bed for purging thereof. Although preferred embodiments of this invention have been described in detail, it is contemplated that modifications of the process may be made and that some features may be employed without others, all within the spirit and scope of the invention.

What is claimed is:

1. In an adiabatic pressure swing process for separation of gas mixtures by selectively adsorbing at least one gas component in each of multiple adsorbent beds by the cycle of introducing feed gas mixture to the bed inlet end at first highest superatmospheric pressure, discharging unadsorbed product effluent from the bed discharge end, releasing initial void space gas from the bed discharge end and introducing the so-released initial gas to the discharge end of another adsorbent bed previously purged of said one component and initially at lower pressure until the two beds are pressure equalized at higher intermediate pressure, releasing gas from the bed inlet end for countercurrent blowdown to lowest pressure, introducing one-component depleted gas from another adsorbent bed to the bed discharge end for desorption of said one component and purging through the bed inlet end, repressurizing the purged bed to said first highest superatmospheric pressure and thereafter repeating the cycle, the improvement comprising at least seven adsorbent beds; simultaneously introducing feed gas mixture to the inlet ends of at least two adsorbent beds in overlapping identical cycles sequentially from the first to the highest numbered bed and thereafter continuously repeating the sequence such that during the initial period of a bed adsorption step the immediately preceding lower numbered bed is also on its adsorption step and during the last period the immediately following higher numbered bed is also on its adsorption step; performing the initial void space gas releasing-pressure equalization in at least three separate phases comprising first pressure equalizing the adsorbent bed having completed its one component adsorption step, with a different previously purged and at least third higher numbered bed initially at lower intermediate pressure so that the two beds are finally at a first equalization pressure; second pressure equalizing the one component-containing adsorbent bed initially at said first equalization pressure with a still different previously purged and at least fourth higher numbered bed initially at still lower intermediate pressure so that the two beds are finally at a second equalization pressure; third pressure equalizing the one component-containing adsorbent bed initially at said second equalization pressure with another previously purged and at least fifth higher numbered bed initially at lowest pressure so that the two beds are finally at a third equalization pressure.

2. A process according to claim 1 wherein the absolute pressure ratio (PR) of the first highest superatmospheric pressure of the adsorption step to the lowest pressure of the process is at least 7, and the product of PR times the molar ratio (S) of the non-adsorbates in the bed at the end of the adsorption step to the total feed gas introduced during such adsorption step is at least 6.

3. A process according to claim 1 wherein at least nine adsorbent beds are provided in overlapping identical cycles such that during the initial period of a bed adsorption step the two immediately preceding lower numbered beds are also on their adsorption steps, during the middle period of a bed adsorption step the immediately preceding lower numbered and immediately following higher numbered beds are also on their adsorption steps, and during the last period of a bed adsorption step the two immediately following higher numbered beds are also on their adsorption steps.

4. A process according to claim 1 wherein said separate phases of initial void space gas releasing from a bed previously on its adsorption step, are consecutive.

5. In an adiabatic pressure swing process for separation hydrogen-rich mixtures by selectively adsorbing at least one component other than hydrogen in each of multiple adsorbent beds by the cycle of introducing feed gas mixture to the bed inlet end at first highest superatmospheric pressure, discharging unadsorbed hydrogen product effluent from the bed discharge end, releasing initial void space gas from the bed discharge end and introducing the so-released initial gas to the discharge end of another adsorbent bed previously purged of said one component and initially at lower pressure until the two beds are pressure equalized at higher intermediate pressure, releasing further void space gas from the bed discharge end for cocurrent depressurization thereof to lower intermediate pressure, releasing gas from the bed inlet end for countercurrent blowdown to lowest pressure, introducing one-component depleted gas from another adsorbent bed to the bed discharge end for desorption of said one component and purging through the bed inlet end, repressurizing the purged bed to said first highest superatmospheric pressure and thereafter repeating the cycle: the improvement comprising providing at least nine adsorbent beds; simultaneously introducing hydrogen-rich feed gas mixture to the inlet ends of three adsorbent beds in overlapping identical cycles sequentially from the first to the highest numbered bed and thereafter continuously repeating the sequence such that during the initial period of a bed adsorption step the two immediately preceding lower numbered beds are also on their adsorption steps, during the middle period of a bed adsorption step the immediately preceding lower numbered and immediately following higher numbered beds are also on their adsorption steps, and during the last period of a bed adsorption step the two immediately following higher numbered beds are also on their adsorption steps; performing the initial void space gas releasing pressure equalization in three separate phases comprising first pressure equalizing an adsorbent bed having completed its one component adsorption step with the fourth higher numbered adsorbent bed initially at a second equalization pressure so that the two beds are finally at a first equalization pressure, second pressure equalizing said adsorbent bed with the fifth higher numbered adsorbent bed initially at a third equalization pressure so that the two beds are finally at said second equalization pressure, and third pressure equalizing said adsorbent bed with the sixth higher numbered adsorbent bed initially at said lowest pressure so that the two beds are finally at said third equalization pressure; further void space gas from said adsorbent bed initially at said third equalization pressure and introducing at least part of said gas to the discharge end of the eighth higher numbered adsorbent for descrption of said one component and purging at said lowest pressure; and thereafter conducting said countercurrent blowdown and purging steps in said adsorbent bed; said steps being performed such that the absolute pressure ratio (PR) of the first highest superatmospheric pressure of the adsorption step to said lowest pressure of the process is at least 7, and the product of PR times the molar ratio (S) of the non-adsorbates in the adsorbent bed at the end of the adsorption step to the total feed gas introduced during the adsorption step is at least 6.

* * * * *